United States Patent
Ellis

(10) Patent No.: US 9,628,864 B2
(45) Date of Patent: *Apr. 18, 2017

(54) INTERACTIVE TELEVISION TARGETED MESSAGE SYSTEM

(71) Applicant: Rovi Guides, Inc., San Carlos, CA (US)

(72) Inventor: Michael D. Ellis, Boulder, CO (US)

(73) Assignee: Rovi Guides, Inc., San Carlos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/483,616

(22) Filed: Sep. 11, 2014

(65) Prior Publication Data

US 2014/0380360 A1    Dec. 25, 2014

Related U.S. Application Data

(63) Continuation of application No. 12/603,953, filed on Oct. 22, 2009, now Pat. No. 8,843,955, which is a
(Continued)

(51) Int. Cl.
*H04N 21/488* (2011.01)
*H04N 7/16* (2011.01)
(Continued)

(52) U.S. Cl.
CPC ......... *H04N 21/4882* (2013.01); *H04N 7/163* (2013.01); *H04N 7/165* (2013.01);
(Continued)

(58) Field of Classification Search
CPC ..................................................... H04N 21/47
(Continued)

(56) References Cited

U.S. PATENT DOCUMENTS 4,694,490 A    9/1987    Harvey et al.
4,704,725 A    11/1987    Harvey et al.
(Continued)

FOREIGN PATENT DOCUMENTS

EP    0382764 A1    8/1990
EP    0721253 A2    7/1996
(Continued)

OTHER PUBLICATIONS

Rath, K. et. al., "Set-Top Box Cotnrol Software: A Key Component in Digital Video," Philips Journal of Research, vol. 50, pp. 185-199 (1996).

*Primary Examiner* — Pankaj Kumar
*Assistant Examiner* — Charles N Hicks
(74) *Attorney, Agent, or Firm* — Ropes & Gray LLP

(57) ABSTRACT

An interactive television system is provided in which targeted messages may be sent to users. The interactive television system may use an interactive television program guide or other interactive applications to provide interactive television services to users. An e-mail or other messaging application may be used to receive the messages. The messaging application may be separate from the program guide or other interactive television application or may be part of the program guide or other interactive television application. Messages may be targeted based on the television channels to which the user subscribes or based on which settings the user has established in the program guide or other application or based on any other suitable criteria.

16 Claims, 14 Drawing Sheets

Related U.S. Application Data continuation of application No. 11/698,679, filed on Jan. 25, 2007, now abandoned, which is a continuation of application No. 11/042,820, filed on Jan. 25, 2005, now abandoned, which is a continuation of application No. 09/717,729, filed on Nov. 21, 2000, now abandoned.

(60) Provisional application No. 60/167,184, filed on Nov. 23, 1999.

(51) Int. Cl.
| | | |
|---|---|---|
| *H04N 7/173* | (2011.01) | |
| *H04N 21/258* | (2011.01) | |
| *H04N 21/262* | (2011.01) | |
| *H04N 21/442* | (2011.01) | |
| *H04N 21/45* | (2011.01) | |
| *H04N 21/454* | (2011.01) | |
| *H04N 21/472* | (2011.01) | |
| *H04N 21/475* | (2011.01) | |
| *H04N 21/4786* | (2011.01) | |
| *H04N 21/4788* | (2011.01) | |
| *H04N 21/482* | (2011.01) | |
| *H04N 21/81* | (2011.01) | |

(52) U.S. Cl.
CPC ......... *H04N 7/173* (2013.01); *H04N 7/17318* (2013.01); *H04N 7/17345* (2013.01); *H04N 21/25891* (2013.01); *H04N 21/26283* (2013.01); *H04N 21/44222* (2013.01); *H04N 21/454* (2013.01); *H04N 21/4532* (2013.01); *H04N 21/4753* (2013.01); *H04N 21/4755* (2013.01); *H04N 21/4786* (2013.01); *H04N 21/4788* (2013.01); *H04N 21/47214* (2013.01); *H04N 21/482* (2013.01); *H04N 21/4825* (2013.01); *H04N 21/4826* (2013.01); *H04N 21/8126* (2013.01)

(58) Field of Classification Search
USPC .................................................. 725/32, 34
See application file for complete search history.

(56) References Cited

U.S. PATENT DOCUMENTS

| | | | |
|---|---|---|---|
| 4,965,825 | A | 10/1990 | Harvey et al. |
| 5,109,414 | A | 4/1992 | Harvey et al. |
| 5,233,654 | A | 8/1993 | Harvey et al. |
| 5,335,277 | A | 8/1994 | Harvey et al. |
| 5,589,892 | A | 12/1996 | Knee et al. |
| 5,661,516 | A | 8/1997 | Carles |
| 5,760,821 | A | 6/1998 | Ellis et al. |
| 5,887,243 | A | 3/1999 | Harvey et al. |
| 5,940,073 | A | 8/1999 | Klosterman et al. |
| 6,029,045 | A | 2/2000 | Picco et al. |
| 6,108,706 | A | 8/2000 | Birdwell et al. |
| 6,177,931 | B1 | 1/2001 | Alexander et al. |
| 6,182,050 | B1 | 1/2001 | Ballard |
| 6,298,482 | B1 | 10/2001 | Seidman et al. |
| 6,493,872 | B1 | 12/2002 | Rangan et al. |
| 6,698,020 | B1 | 2/2004 | Zigmond et al. |
| 6,718,551 | B1 | 4/2004 | Swix et al. |
| 6,742,183 | B1 | 5/2004 | Reynolds et al. |
| 6,983,480 | B1 | 1/2006 | Sie et al. |
| 7,003,792 | B1 | 2/2006 | Yuen |
| 7,100,183 | B2 | 8/2006 | Kunkel et al. |
| 7,222,155 | B1 | 5/2007 | Gebhardt et al. |
| 2002/0095676 | A1 | 7/2002 | Knee et al. |
| 2005/0028191 | A1 | 2/2005 | Sullivan et al. |
| 2005/0039177 | A1* | 2/2005 | Burke ............... H04N 5/76 717/165 |
| 2006/0212900 | A1* | 9/2006 | Ismail ............... H04H 60/06 725/34 |
| 2008/0046524 | A1* | 2/2008 | Jerding ............ H04L 12/2801 709/206 |

FOREIGN PATENT DOCUMENTS

| | | |
|---|---|---|
| EP | 0752767 A2 | 1/1997 |
| EP | 0854654 | 7/1998 |
| EP | 0905985 A2 | 3/1999 |
| EP | 0935393 A2 | 8/1999 |
| EP | 963119 | 12/1999 |
| JP | 10228687 | 8/1998 |
| JP | 10293793 | 11/1998 |
| WO | WO-8902682 A1 | 3/1989 |
| WO | WO-9826584 | 6/1998 |
| WO | WO-9913641 | 3/1999 |
| WO | WO-9914947 | 3/1999 |
| WO | WO-9918722 | 4/1999 |
| WO | WO-9949663 | 9/1999 |
| WO | WO-9952285 A1 | 10/1999 |
| WO | WO-9960783 A1 | 11/1999 |
| WO | WO-0005889 A1 | 2/2000 |
| WO | WO-0028734 A1 | 5/2000 |
| WO | WO-0139501 A1 | 5/2001 |

\* cited by examiner

INTERACTIVE TELEVISION TARGETED MESSAGE SYSTEM

CROSS-REFERENCE TO RELATED APPLICATIONS

This is a continuation of U.S. patent application Ser. No. 12/603,953, filed Oct. 22, 2009, which is a continuation of U.S. patent application Ser. No. 11/698,679, filed on Jan. 25, 2007, which is a continuation of U.S. patent application Ser. No. 11/042,820, filed on Jan. 25, 2005, which is a continuation of U.S. patent application Ser. No. 09/717,729, filed on Nov. 21, 2000, which claimed the benefit of U.S. provisional patent application No. 60/167,184, filed Nov. 23, 1999, each of which is hereby incorporated herein by reference in its entirety.

BACKGROUND OF THE INVENTION

This invention relates to distributing and using electronic messages in an interactive television environment.

Interactive television applications such as program guides are well known. Such guides, which are typically implemented on set-top boxes, allow users to view television program listings on their home televisions. Typical program guides allow users to view information for television programs and channels and audio programs and channels. For example, a program guide may provide information on regular television channels, premium television channels, pay-per-view television channels, and music channels. A variety of display formats are typically supported. For example, program listings may be organized by time, by channel, and by category (sports, children, comedy, movies, etc.).

Other interactive television applications include e-mail readers, web browsers, video-on-demand applications, home banking applications, home shopping applications, etc.

Program guides typically receive program schedule data from a central source. Various data distribution schemes may be used. In one suitable distribution scheme, a global set of program schedule data is transmitted nationwide to numerous cable systems. Each cable system typically has a different channel lineup.

As a result, the global set of program schedule data that is provided by the central source includes data for all cable systems. The global program schedule data may be filtered so that only an appropriate subset of the data is delivered to each subscriber.

The central program guide data source may distribute messages to all subscribers in a particular cable system. Cable operators may also communicate with their subscribers using messages. For example, a cable operator may send a message to a subscriber who has not paid their last bill.

It has not been possible, however, to use existing systems to deliver messages to particular subscribers that are targeted based on criteria such as subscriber-defined program guide settings or the channels to which the subscriber has subscribed.

It is therefore an object of the present invention to provide targeted messaging systems for television service subscribers in a cable television system, satellite television system, broadcast television system, or the like.

SUMMARY OF THE INVENTION

In accordance with the present invention, an interactive television system is provided. Television programming is delivered, to users with equipment such as television equipment based on set-top boxes or the like or computer equipment. The system provides targeted messages to the users at such user equipment.

Interactive television applications such as program guides, interactive messaging applications (e.g., e-mail readers), web browsers, and other such applications may be implemented using the user equipment. Applications may be run locally (e.g., on a set-top box or personal computer) or may use a client-server architecture (e.g., an arrangement in which a set-top box or other platform acts as a client processor and generates requests for data from a server-processor such as a server computer located at a cable system headend or a server computer located on the Internet).

Program guides based on set-top box systems may be provided that display television, messages, menu options, and various program guide display screens on a monitor (e.g., a television) that is connected to the set-top box.

Messages, which may be e-mail or other subscriber messages, may be targeted to a user based on which television programming and other services are available in the user's home. For example, an interactive television application provider or other service provider may send a message to all users (e.g., all program guide users) who have or who do not have a specific channel in their local lineup or who have or who have not subscribed to a particular channel or other service. Messages may also be sent to all users who have or who have not set a reminder for a specific program or other content, who have or who have not scheduled a specific program or other content for recording, or who have or who have not selected a specific program, channel, or other content as a favorite. If desired, messages may be sent to all users who have or who have not ordered specific products or services, (e.g., a specific pay-per-view (PPV) program, a specific package of pay-per-view programs, video-on-demand, a specific product, etc.). Messages may be targeted based on parental control settings. Any suitable combination of these criteria or other suitable criteria may be used.

As an example, a message may be targeted to those users who have or who have not subscribed to or ordered a particular set of channels or any channel in a set of channels.

The messages may be used by a program guide or other application to send programming-related messages such as last minute schedule changes to only those users who might be interested. Users who do not subscribe to the affected service need not be notified of such changes.

If desired, messages may be distributed by a cable provider or programmer (to a program guide or independent of any program guide) to target messages to users who are interested in a particular program or who do not have access to certain programming and hence might be potential customers.

Messages may be distributed to user television equipment and user computer equipment from a computer at a main facility such as a program guide data source facility. Messages may be distributed through a plurality of television distribution facilities (e.g., cable system headends or the like). Messages may also be distributed to set-top boxes from equipment at the television distribution facilities.

Messages may be provided with targeting criteria. For example, messages may be tagged with a unique identifier (ID) or a list of unique IDs associated with the referenced program(s) or channel(s). As an example, to target a message only to Home Box Office (HBO) subscribers, the message may be prefaced with a code indicating that a channel source ID will follow, and that only users authorized for that source ID should receive that message.

The message may be automatically accepted or discarded by the user's message receipt/display application. That application may be an e-mail application, may be part of a program guide, or may be part of any other suitable application.

The application may be implemented using user equipment in the home such as a set-top box, or it may be client-server based, with only the client application in the home.

Further features of the invention, its nature and various advantages, will be more apparent from the accompanying drawings and the following detailed description of the preferred embodiments.

DETAILED DESCRIPTION OF THE PREFERRED EMBODIMENTS

Figure 1:
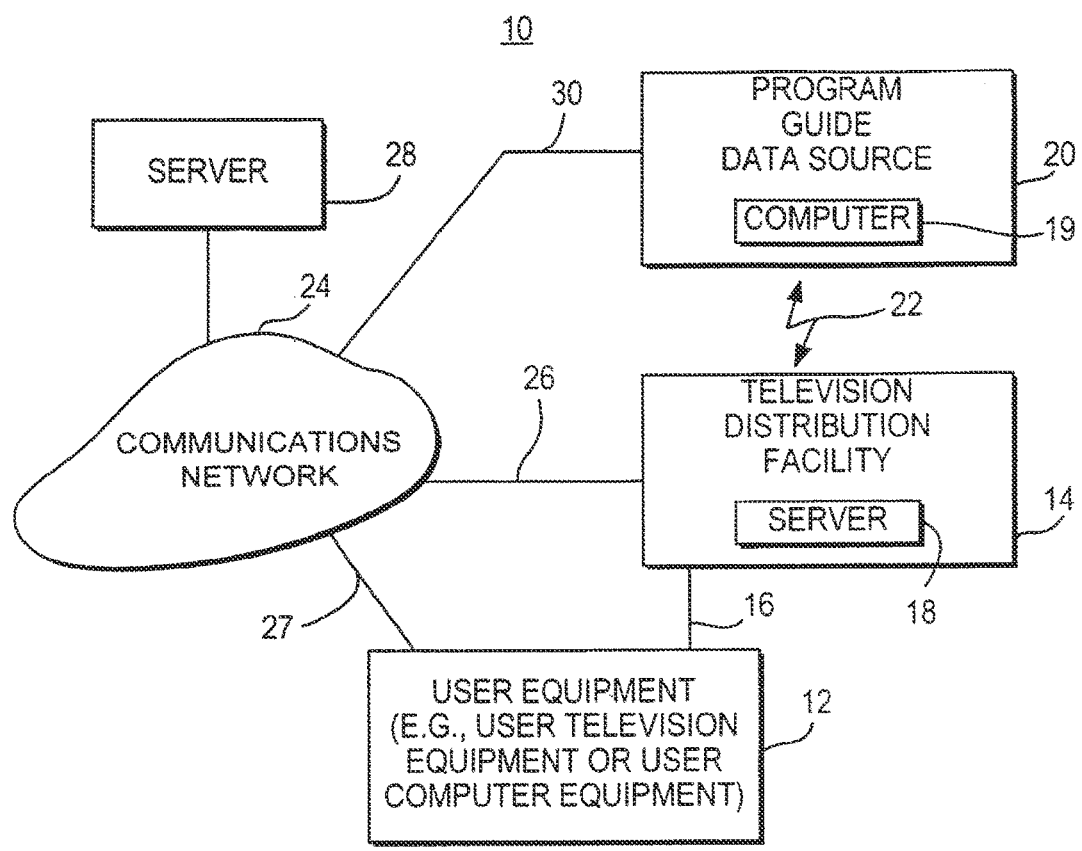
FIG. 1 is a schematic diagram of an illustrative interactive television system in accordance with the present invention.

An illustrative interactive television system 10 is shown in FIG. 1. A user at user equipment 12 may receive television programming and other services from television distribution facility 14 over communications path 16. Television distribution facility 14 may be a satellite television facility, a cable system headend, a broadcast facility, or any other suitable facility for distributing television programming to the user. Communications path 16 may be a satellite link, a broadcast link, a cable link, a fiber-optic link, a combination of such links, or any other suitable link. There may be numerous television distribution facilities, but only one such facility is shown in FIG. 1 to avoid overcomplicating the drawings.

Television programming may be provided over path 16 using any suitable approach. For example, television programming may be provided as analog television signals, as digital streams, or as a combination of analog signals and digital streams.

An interactive television program guide may be implemented using user equipment 12. For example, an interactive television program guide may be implemented on user equipment 12. If desired, the interactive television program guide may be implemented using a client-server or distributed architecture in which user equipment 12 acts as the client processor and servers or other computing equipment such as server 18 act as one or more server processors.

Program guide data for the program guide application (e.g., program listings, program descriptions, etc.) may be provided to the program guide for storage in a program guide database. Such a database may be maintained on a server such as server 18 or on user equipment 12 or any other suitable location. Program guide data and other data used by the program guide may be distributed using any suitable data distribution technique. For example, if the program guide application is implemented using user equipment 12, program guide data may be distributed to user equipment 12 in the television vertical blanking interval, on a sideband, using a separate data path from the television signal or a separable data stream, etc. Computer 19, server 18, and server 28 preferably include a processor to handle information distribution tasks.

User equipment 12 preferably includes a processor to handle tasks associated with implementing a program, guide application. User equipment 12 may connect to the Internet or other suitable communications network 24 via path 16, television distribution facility 14, and path 26. Path 26 may be any suitable communications path, such as a cable link, a satellite link, a fiber-optic link, telephone link, wireless link, or any other such path or combination of such paths.

User equipment 12 may also connect to communications network 24 over link 27, which may be any suitable communications path, such as a cable link, a satellite link, a fiber-optic link, or any other such path or combination of such paths.

Regardless of how user equipment 12 connects to communications network 24, user equipment 12 may receive content from computers such as server 18, server 28, and computer 19. For example, user equipment 12 may support a web browser that allows the user to view web pages or the like or an e-mail or other messaging application that allows the user to receive messages. If desired, the user may view web pages that are stored on server 18 using a web browser.

Applications other than web browser-applications and e-mail applications may also be used to obtain content and access services from computers such as server 18, server 28, and computer 19. Suitable applications include interactive program guide applications, home shopping applications, home banking applications, video-on-demand applications, etc. E-mail applications and web browser capabilities may be incorporated into such applications and program, guide applications if desired. A common navigation shell may be used to provide access to the applications if desired.

Servers such as servers 18 and 28 may be associated with Internet service providers, program guide providers, application providers, cable system operators, broadcast or satellite television operators, etc. Computer 19 may be associated with an interactive television application provider.

If desired, program schedule information may be provided to user equipment 12 from computer 19 of program guide data source 20 using communications path 30, communications network 24, and communications path 27. Communications path 30 may be any suitable communications path, such as a wired link, a satellite link, a fiber-optic link, or any other such path or combination of such paths.

Users may use various types of user equipment to receive television programming from television distribution facility 14 and to receive messages and access services such as interactive television program guides and non-program-guide applications. For example, user equipment may be based on user television equipment such as a set-top box and a television. User equipment may also be based on a personal computer. If desired, user equipment arrangements may be based on personal computer televisions (PC/TVs) and WebTV boxes.

Figure 2:
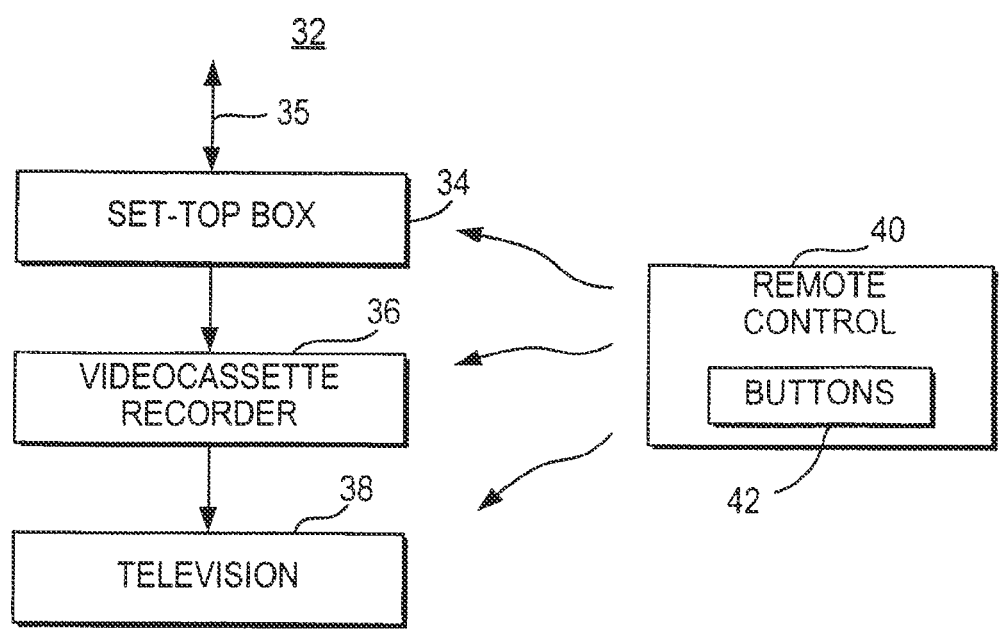
FIG. 2 is a schematic diagram of illustrative user television equipment in accordance with the present invention.

Illustrative user television equipment 32 is shown in FIG. 2. Each set top box 34 preferably contains a processor to handle tasks associated with implementing a program guide application on set top box 34. Set top box 34 is typically connected to a television 38 or other display device. Set-top box 34 may receive television programming and data at line or input 35. Set-top box 34 may have analog and digital television tuning circuitry for handling analog and digital television signals. Television signals may be passed to videocassette recorder 36 or any other suitable recording device for recording. Set-top box 34 may also control the operation of videocassette recorder 36. For example, set-top box 34 may issue infrared commands that are received by videocassette recorder 36 at the same inputs at which standard remote control commands are received.

Videocassette recorder 36 may be connected to television 38. Television programming and graphic display screens generated by applications implemented using set-top box 34 may be passed from set-top box 34 to television 38 through videocassette recorder 36. If desired, videocassette recorder 36 may be omitted.

Set-top box 34 has memory and processing circuitry. This allows set-top box 34 to be used to implement applications that support an interactive television program guide, web browsing and Internet access, e-mail and other messaging services, and other services such as home shopping, home banking, and video-on-demand services, etc.

A remote control 40 such as an infrared remote control may be used to control set-top box 34, videocassette recorder 36, and television 38. Remote control 40 may have buttons 42 such as a power button, right, left, up, and down arrow keys, an OK or select key, a favorites or fav key, a lock or parental control key, a record key, etc.

Figure 3:
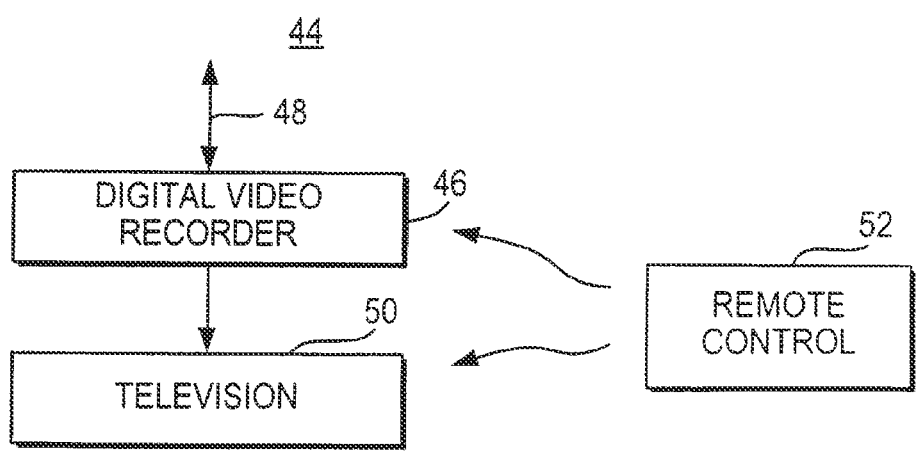
FIG. 3 is schematic diagram of additional illustrative user television equipment in accordance with the present invention.

Illustrative user television equipment 44 based on a digital video recorder 46 is shown in FIG. 3. Digital video recorder 46 may receive television programming and may access interactive services using line or input 48. Digital video recorder 46 may have analog and digital tuning circuitry to receive and process television signals. Digital video recorder 46 may be used to record television programs in any suitable format. For example, digital videos may be stored using the MPEG-2 format.

Recorded videos or real-time videos from input 48 may be displayed on television 50 or any other suitable monitor. A remote control 52 such as an infrared remote control may be used to control digital video recorder 46 and television 50. Remote control 52 may have buttons such as a power button, right, left, up, and down arrow keys, an OK or select key, a favorites or fav key, a lock or parental control key, a record key, etc.

Digital video recorder 46 has memory and processing circuitry that allows digital video recorder 46 to be used to implement applications that support an interactive television program guide, web browsing and Internet access, e-mail and other messaging services, and other services such as home shopping, home banking, and video-on-demand services, etc. Television programming and display screens generated by interactive applications may be displayed on television 50.

Figure 4:
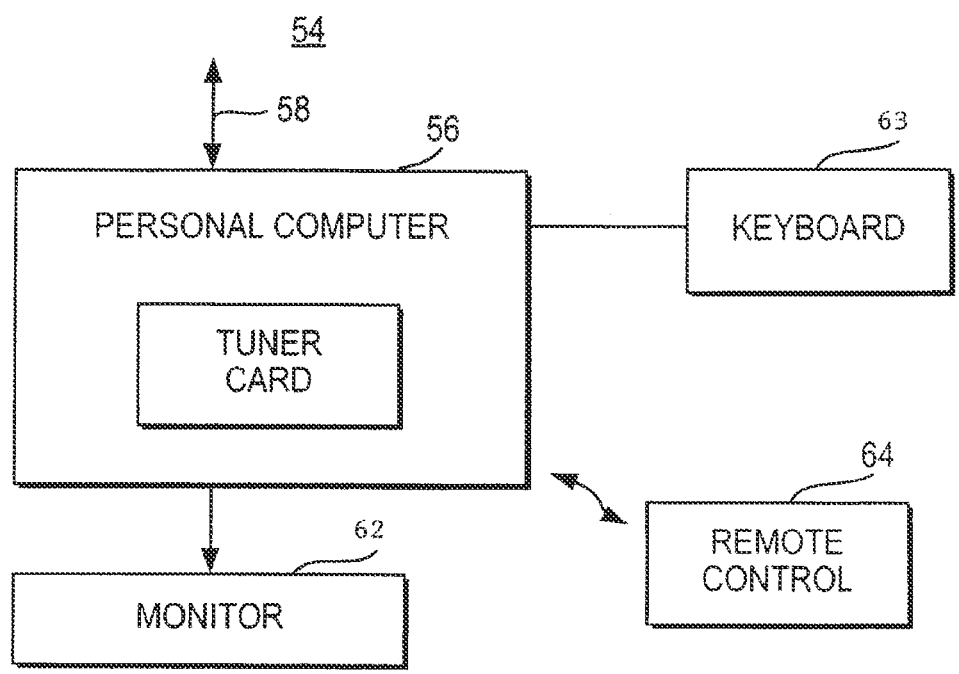
FIG. 4 is a schematic diagram of illustrative user computer equipment in accordance with the present invention.

Illustrative user computer equipment 54 is shown in FIG. 4. User computer equipment 54 may be based on a personal computer 56 or any other suitable computing device. A personal computer with television capabilities will hereinafter be referred, to as personal computer 56. Each personal computer 56 preferably contains a processor to handle tasks associated with implementing a program guide application on personal computer 56. Personal computer 56 is typically connected to a monitor 62 or other display device. Personal computer 56 may receive television programming and information for interactive services using line or input 58. Personal computer 56 may contain a tuner card or other suitable circuitry for handling analog and digital television signals. Personal computer 56 may also contain memory and processing circuitry that allows personal computer 56 to be used to implement applications that support an interactive television program guide, web browsing and Internet access, e-mail and other messaging services, and other services such as home shopping, home banking, and video-on-demand services, etc.

Television signals and screens generated by interactive applications may be displayed on monitor 62.

The user may interact with personal computer 56 using any suitable user input interface, such as keyboard 63, a pointing device such as a trackball, mouse, or touch pad, a voice recognition system, a handwriting recognition system, etc. If desired, the user may interact with personal computer 56 using a wireless remote control such as remote control 64. Remote control 64 may be, for example, an infrared remote control.

User equipment 12 such as user television equipment 32 or 44 of FIGS. 2 and 3 and user computer equipment 54 of FIG. 4 may communicate with communications network 24 and television distribution facility 14 and other facilities using telephone modems, cable modems, digital subscriber line (DSL) modems, integrated digital services network (ISDN) modems, wireless communications circuitry, or any other suitable communications circuitry.

Figure 5:
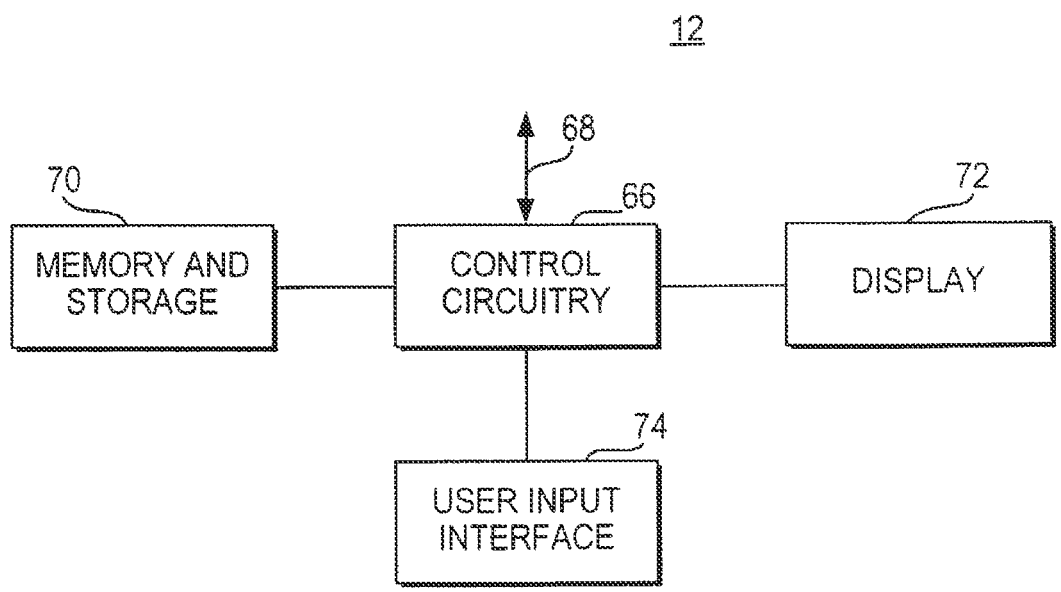
FIG. 5 is a schematic diagram of illustrative user equipment in accordance with the present invention.

A generalized schematic diagram of user equipment 12 of FIG. 1 is shown in FIG. 5. Control circuitry 66 and memory and storage 70 may have communications and memory and processing circuitry for supporting functions such as receiving television programming and e-mail and other messages and accessing interactive services over line 68. Line 68 may connect to communications paths such as paths 16 and 27 of FIG. 1. Videos may be stored in storage 70. Television programming and text, graphics, and video associated with interactive services may be presented to the user with display 72. Display 72 may be a television, a computer monitor, or any other suitable display equipment.

The user may interact with control circuitry 66 using any suitable user input interface 74, such as a remote control, a keyboard, a wireless keyboard, a display remote, a handheld computer, a mouse, a trackball, a touch pad, or any other suitable input device.

Program listings information may be provided to the user with user equipment 12. For example, an interactive television program guide that is implemented using user equipment 12 may be used to display various screens of program listings organized by time, by television channel, by time and channel (e.g., in the form of a grid or the like), etc.

Program guide data sources such as program guide data source 20 may distribute television program listings to multiple television distribution facilities. Only one such television distribution facility 14 is shown in FIG. 1 to avoid overcomplicating the drawings. Each television distribution facility may have a different channel lineup. Moreover, each user associated with a given television distribution facility may subscribe to different channels. Users may also set various settings in program guides or other applications.

If desired, the information on which services the user subscribes to, the reminders that the user has set, information on the favorites settings of the user, information on the user's parental control settings, information on which content the user has set for recording, information on which products and services (e.g., pay-per-view programs) the user has ordered, and other such information may be stored in user equipment 12. In another suitable approach, the information may be stored on a remote computer such as server 18, server 28, or computer 19. Servers such as server 18 are associated with the television distribution facility from which the user receives television programming. If a program guide or other interactive television application is implemented using a client-server arrangement involving user equipment 12 and server 18, the information may be stored at server 18 by a client-server application. If server 28 supports an on-line program guide, the information may be stored at server 28 by the on-line program guide. Any other suitable approach or a combination of such approaches may also be used.

The interactive television application provider or television service provider such as a cable system operator at television distribution facility 14 may send targeted messages to users at user equipment 12. The interactive television application provider may be a program guide provider at program guide data source 12, or any other suitable service provider (e.g., an e-mail service provider, a shopping service provider). The targeted messages may be based on the services to which the user subscribes, may be based on which products and services the user orders, may be based on which settings the user has established in the program guide or other application, or may be based on any other suitable criteria.

Some of the settings that the user may establish in an interactive program guide include settings related to parental controls (e.g., whether certain channels or programs have been locked), favorites or preferences (e.g., whether the user has informed the program guide of the user's preferences in certain channels, programs, categories of programming, etc.), recording (e.g., whether certain programs have been selected for automatic recording by the program guide), and reminders (e.g., whether the user has directed the program guide to remind the user when a particular television program is about to begin). These are merely illustrative examples. The user may establish any suitable settings using an interactive television program guide. Moreover, the user may establish settings using other interactive television applications such as e-mail applications, home banking applications, video-on-demand applications, etc.

The filtering process that occurs when comparing the targeting criteria with each user's information may be performed at user equipment 12 or may be performed at any other suitable location within the message distribution path. For example, messages may be filtered at television distribution facilities such as television distribution facility 14, etc.

Figure 6:
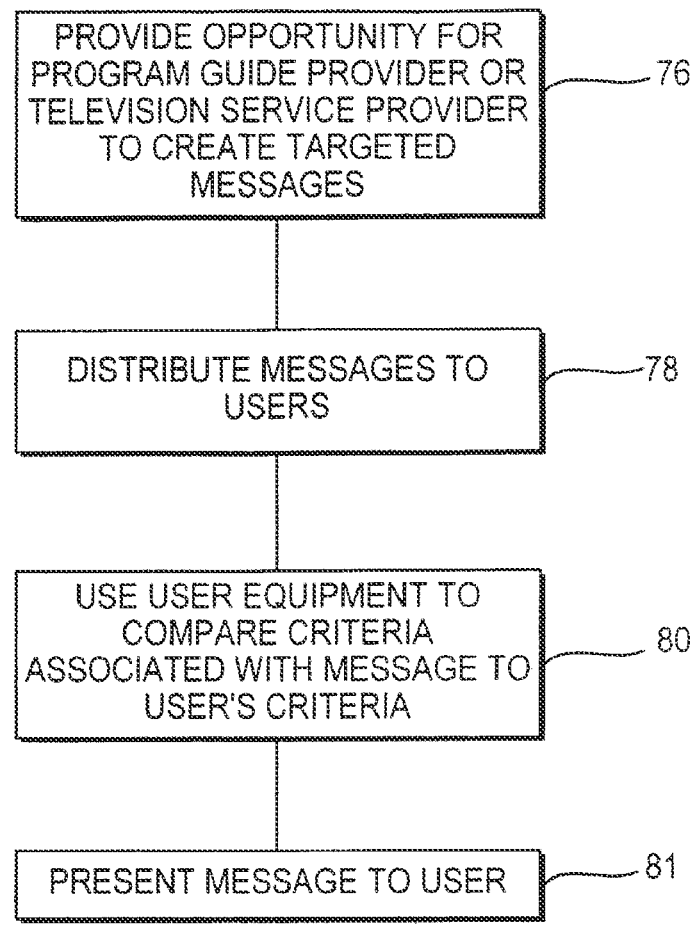
FIG. 6 is a flow chart of illustrative steps involved in providing targeted messages to users in accordance with the present invention.

Any of these settings or other such information may be used as criteria for distributing targeted messages to users. Illustrative steps involved in distributing targeted messages to users are shown in FIG. 6. At step 76, the program guide provider, television service provider, or any other service provider may be provided with an opportunity to create targeted messages. For example, a message creation tool implemented on computer 19, server 18, or server 28 may be used to create messages. Messages may promote services, may provide last-minute schedule changes, etc. Messages may be created automatically by the message creation tool and targeted toward various classes of users. If desired, messages may be created with input from personnel at the program guide provider or television service provider.

At step 78, the messages are distributed to users. For example, messages may be sent to users from a program guide provider at program guide data source 20 via path 30, communications network 24, and path 27, via path 30, communications network 24, path 26, television distribution facility 14, and path 16, or via path 22, television distribution facility 14, and path 16. Messages may be sent to users from a television service provider at television distribution facility 14 via path 16 or via path 26, communications network 24, an path 27.

At step 80, the user equipment 12 may be used to compare stored user information with criteria that are associated with the message. If the criteria are satisfied, the messages may be presented to the user at step 81. The message may be presented in the form of a message delivered to the user's e-mail in-box, as a pop-up overlay on top of the content being displayed on user equipment 12, or using any other suitable technique.

In comparing the targeting criteria to the stored user information at step 80, boolean logic terms (e.g., NOT, AND, OR, etc.) may be used. For example, a message may be targeted to all users who subscribe to (HBO or TBS) but NOT (SHO or TMC). Ranges may also be used. For example, a message may be targeted to all users who have set reminders for programs scheduled to start after 7:00 PM. Multiple criteria may need to be satisfied. For example, messages may be targeted to all users who have HBO AND who have SHO set as a favorite.

Figure 7:
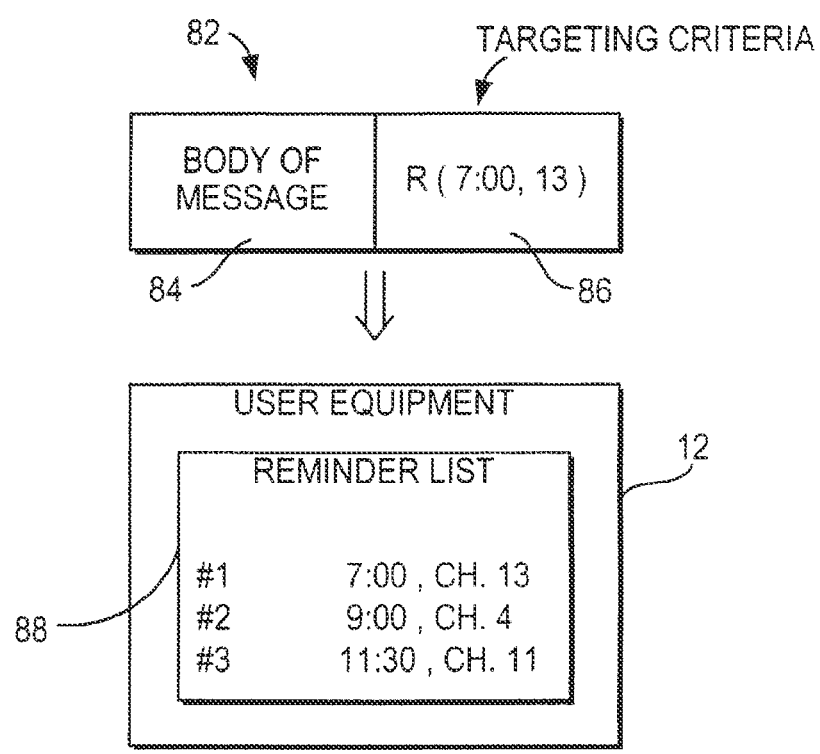
FIG. 7 is a diagram showing how messages may have associated targeting criteria in accordance with the present invention.

An example of a targeted message is shown in FIG. 7. Message 82 may contain a message body 84, which may contain text, graphics, audio, or video. Message 82 may also contain message targeting criteria 86. Message 82 is distributed to user equipment 12 where targeting criteria 86 are compared with data such as program guide data. Program guide data may include reminder list 88.

In the example of FIG. 7, message 82 has been provided with targeting criteria based on reminders. In particular, the criteria R (7:00, 13) specifies that the reminder is directed toward users who have a reminder set for channel 13 at 7:00. If desired, the channel number may be a source identifier (ID) that uniquely specifies which the television service of interest. Such a source ID may be used in program guide data source 20 to globally identify different sources of programming.

Regardless of how the channel information is specified, the information may be compared with the information in the user's reminder list 88. This allows the program guide, e-mail reader, or other suitable application at user equipment 12 to determine whether the user has set a reminder for the designated time and channel. In the example of FIG. 7, the targeted message may be presented to the user, because the user has set a reminder (reminder No. 1) for 7:00 on channel 13.

Figure 8:
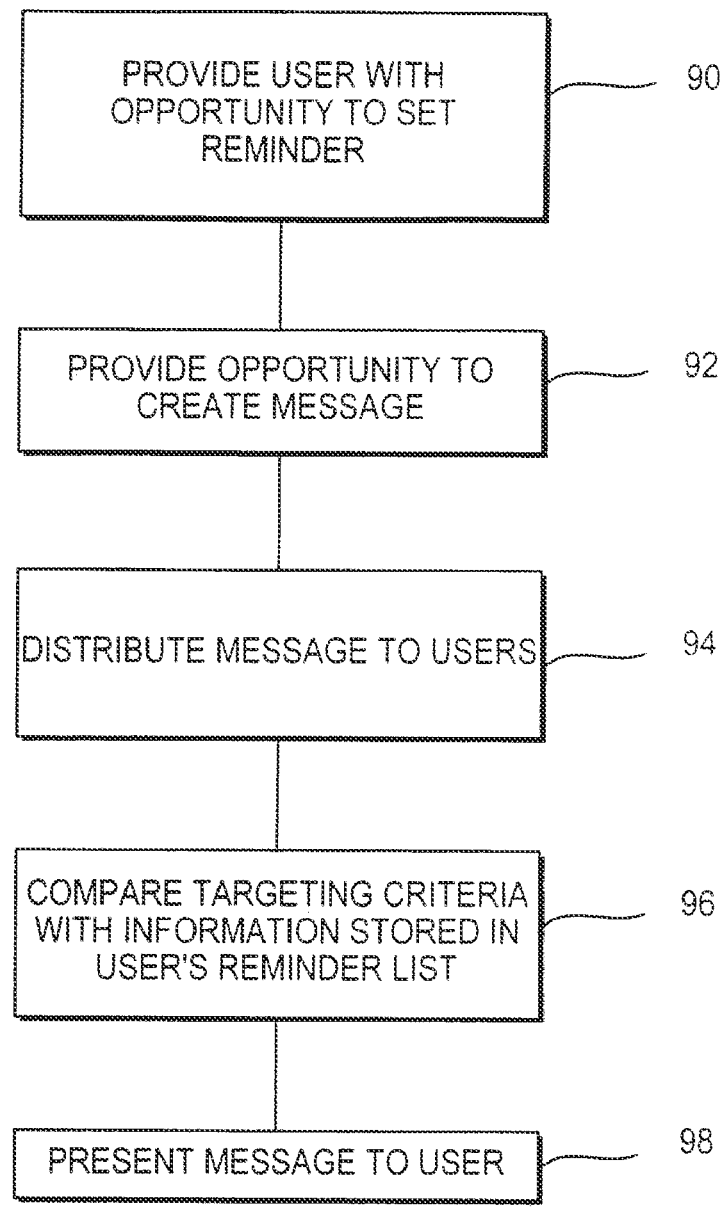
FIG. 8 is a flow chart of illustrative steps involved in providing targeted messages to users based on which reminders have been set in accordance with the present invention.

Illustrative steps involved in providing messages to users based on reminders settings are shown in FIG. 8. At step 90, the user may be provided with an opportunity to set a reminder. Such reminders may include a reminder for a television program, a web reminder for a web cast, a web reminder for a chat session, a banking reminder, or any other suitable reminder. For example, a program listings grid may be displayed on user equipment 12 that contains program listings for various channels and times. The user may scroll through the program listings to locate a future program of interest using a highlight region or the like. When the user has highlighted a program of interest, the user may press an OK key on a remote control. This directs the program guide to provide the user with on-screen options that allow the user to set a reminder. Information on which reminders have been set by the user may be stored in user equipment 12, server 18, server 28, computer 19, any other suitable device, or a combination thereof.

At step 92, the program guide provider, television service provider, or any other provider may use a message creation tool to automatically or manually generate targeted messages to be delivered to the user. For example, a message may be created that promotes a new television program that is expected to be popular to users who enjoy program Z. The message may be targeted to users who have set reminders for program Z. As another example, a message may be created that includes information on a last-minute schedule change for program Z. The message may be targeted to users who have set reminders for program Z.

At step 94, the message may be distributed to users. For example, the message may be sent to users from a program guide provider at program guide data source 20 via path 30, communications network 24, and path 27, via path 30, communications network 24, path 26, television distribution facility 14, and path 16, or via path 22, television distribution facility 14, and path 16. Messages may be sent to users from a television service provider at television distribution facility 14 via path 16 or via path 26, communications network 24, and path 27.

At step 96, the program guide or other suitable interactive television application or the like may compare the targeting criteria from message 82 with stored user information by the interactive television application or other application in user equipment 12, server 18, server 28, computer 19, any other suitable device, or a combination thereof. In particular, the targeted message criteria may be compared with information in the user's reminder list 88 or other such file or data structure stored by the interactive television program guide or any other suitable application. If the targeted message criteria are satisfied, the message may be displayed on user equipment 12 at step 98.

Figure 9:
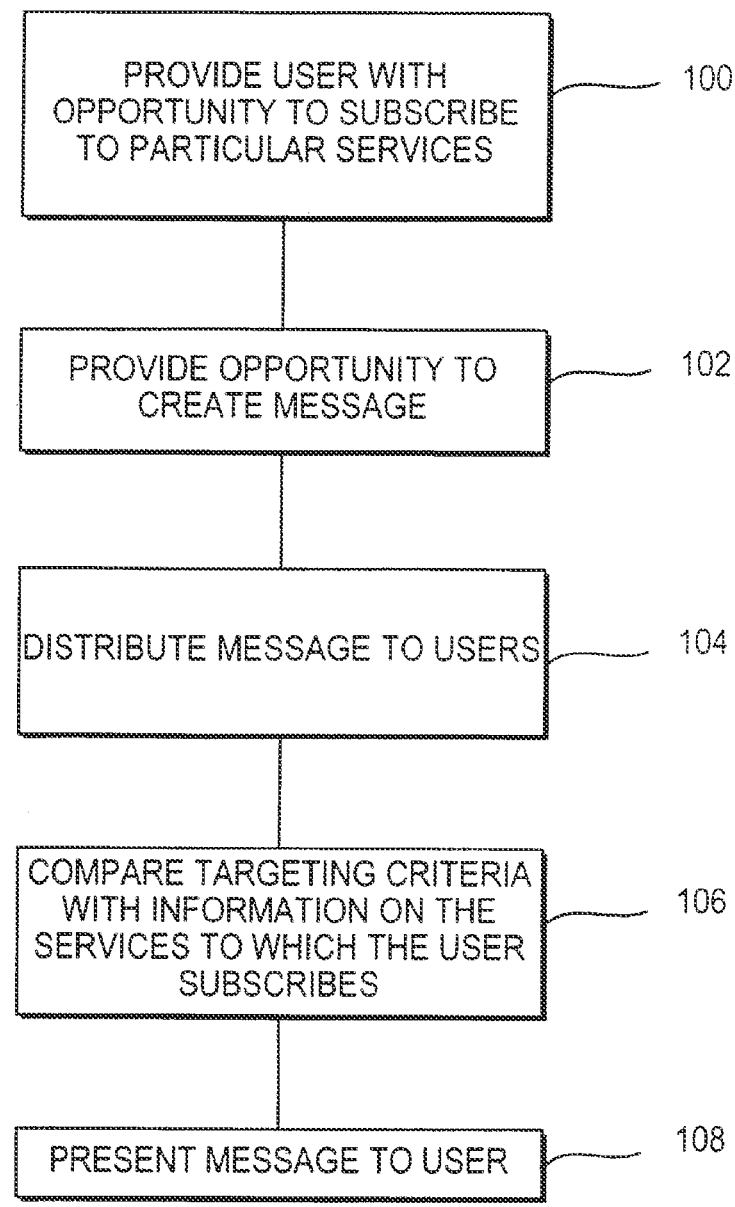
FIG. 9 is a flow chart of illustrative steps involved in providing targeted messages to users based on which services the user subscribes to in accordance with the present invention.

Illustrative steps involved in providing messages to users based on particular services to which the user subscribes are shown in FIG. 9. Such services may include television channels, shopping web sites, etc. At step 100, the user may be provided with an opportunity to subscribe to certain services. For example, a cable operator or other television service provider may provide on-screen options that allow the user to order television services (e.g., premium television channels or packages of premium television channels) through a program guide implemented on user equipment 12. Television services may also be ordered on-line or over the telephone. Information on which services have been subscribed to may be stored on user equipment 12, server 18, server 28, computer 19, any other suitable device, or a combination thereof.

At step 102, the program guide provider, television service provider, or any other provider may use a message creation tool to automatically or manually generate targeted messages to be delivered to the user. For example, a message promoting channel X may be created for all subscribers of channel Y who do not subscribe to channel X.

At step 104, the message may be distributed to users. For example, the message may be sent to users from a program guide provider at program guide data source 20 via path 30, communications network 24, and path 27, via path 30, communications network 24, path 26, television distribution facility 14, and path 16, or via path 22, television distribution facility 14, and path 16. Messages may be sent to users from a television service provider at television distribution facility 14 via path 16 or via path 26, communications network 24, and path 27.

At step 106, the program guide or other suitable interactive television application or the like may compare the targeting criteria from the message with stored user information by the interactive television application or other application in user equipment 12, server 18, server 28, computer 19, any other suitable device, or a combination thereof. In particular, the targeted message criteria may be compared with information that indicates which television channels the user subscribes to. This type of information may, if desired, be maintained by the program guide, by the television service provider, or any other suitable provider. If the targeted message criteria are satisfied, the message may be displayed on user equipment 12 at step 108.

Figure 10:
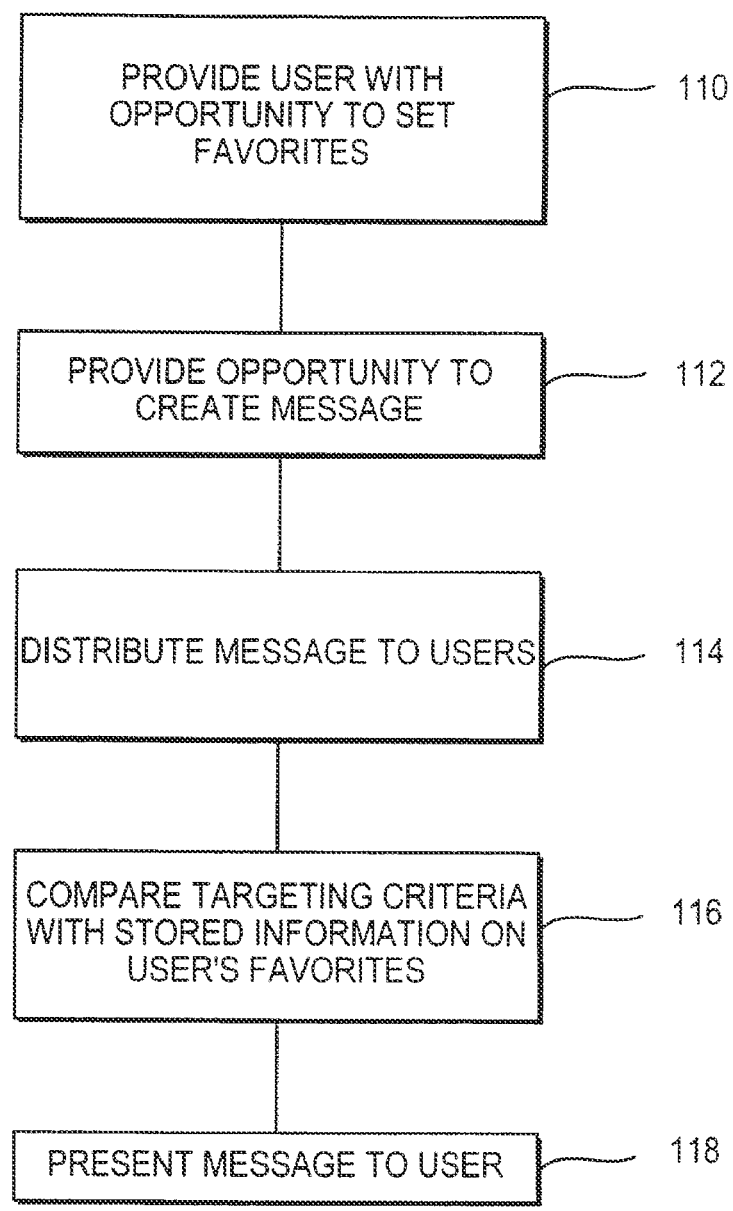
FIG. 10 is a flow chart of illustrative steps involved in providing targeted messages to users based on which favorites settings the user has established in accordance with the present invention.

Illustrative steps involved in providing messages to users based on favorite channel settings, favorite program settings, favorite web sites, and other favorites settings are shown in FIG. 10. At step 110, the user may be provided with an opportunity to set favorites. For example, the interactive television program guide may provide the user with on-screen lists of programs and channels. If the user highlights a desired channel or program, and presses a remote control "favorites" key, the program, guide will set that channel or program as a favorite. The user may also respond to on-screen prompts such as "set this program as a favorite?" or the like. If desired, preferences or favorites may be established for certain genres or categories of programming. Information on the user's favorites settings may be stored on user equipment 12 (e.g., by the program guide), server 18, server 28, computer 19, any other suitable device, or a combination thereof.

At step 112, the program guide provider, television service provider, or any other provider may use a message creation tool to automatically or manually generate targeted messages to be delivered to the user. For example, a message promoting channel X may be created for all subscribers who have set channel Y as a favorite, but have not set channel X as a favorite.

At step 114, the message may be distributed to users. For example, the message may be sent to users from a program guide provider at program guide data source 20 via path 30, communications network 24, and path 27, via path 30, communications network 24, path 26, television distribution facility 14, and path 16, or via path 22, television distribution facility 14, and path 16. Messages may be sent to users from a television service provider at television distribution facility 14 via path 16 or via path 26, communications network 24, and path 27.

At step 116, the program guide or other suitable interactive television application or the like may compare the targeting criteria from the message with stored user information by the interactive television application or other application in user equipment 12, server 18, server 28, computer 19, any other suitable device, or a combination thereof. In particular, the targeted message criteria may be compared with information that indicates which favorites settings the user has made in the interactive television program guide or other application that supports favorites. This type of information may, if desired, be maintained by the program guide. If the targeted message criteria are satisfied, the message may be displayed on user equipment 12 at step 118.

Figure 11:
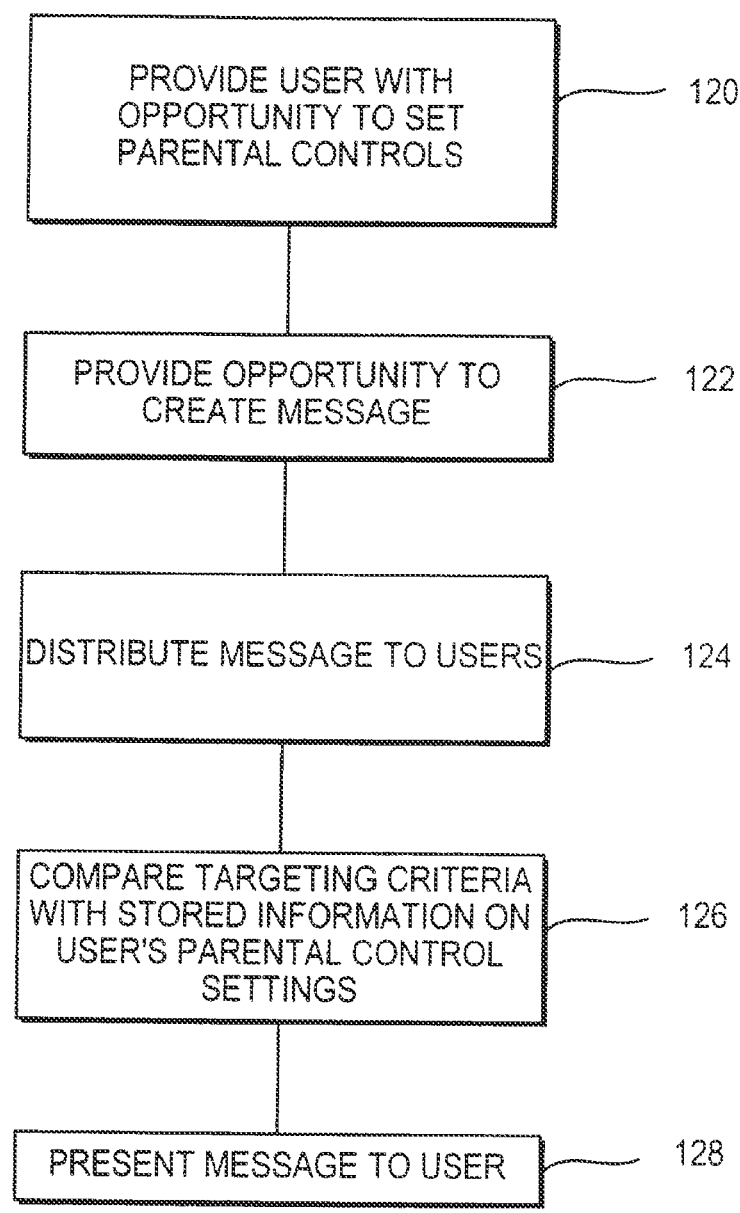
FIG. 11 is a flow chart of illustrative steps involved in providing targeted messages to users based on which parental control settings the user has established in accordance with the present invention.

Illustrative steps involved in providing messages to users based on parental control settings are shown in FIG. 11. At step 120, the user may be provided with an opportunity to set parental controls. For example, the interactive television program guide may provide the user with on-screen lists of programs and channels. If the user highlights a desired channel or program and presses a remote control "lock" key, the program guide will lock that channel or program. A subsequent viewer must provide the correct personal identification number (PIN) to unlock the locked programming. Programs may also be locked by responding to on-screen options. Such options may be provided, for example, by a program guide when the user requests additional information using a remote control "info" key. If desired, genres of programming may be locked or programming may be locked based on parental guidance ratings (e.g., TV-Y, TV-G, TV-MA, R, NC-17, etc.). As another example, shopping web sites, genres of web sites, or any other web site or other type of content may also be locked. Information on the user's parental control settings (e.g., which programs, channels, genres of programming, ratings, etc. have been locked) may be stored on user equipment 12 (e.g., by the program, guide), server 18, server 28, computer 19, any other suitable device, or a combination thereof.

At step 122, the program guide provider, television service provider, or any other provider may use a message creation tool, to automatically or manually generate targeted messages to be delivered to the user. For example, a message promoting channel X or promoting a pay-per-view program may be created for all subscribers who have not blocked programming with a TV-MA or R rating.

At step 124, the message may be distributed to users. For example, the message may be sent to users from a program guide provider at program guide data source 20 via path 30, communications network 24, and path 27, via path 30, communications network 24, path 26, television distribution facility 14, and path 16, or via path 22, television distribution facility 14, and path 16. Messages may be sent to users from a television service provider at television distribution facility 14 via path 16 or via path 26, communications network 24, and path 27.

At step 126, the program guide or other suitable interactive television application or the like may compare the targeting criteria from the message with stored user information by the interactive television application or other application in user equipment 12, server 18, server 28, computer 19, any other suitable device, or a combination thereof. In particular, the targeted message criteria may be compared with information on the parental control settings that the user has established using an interactive program guide or other interactive television application. This type of information may, if desired, be maintained by the program guide. If the targeted message criteria are satisfied, the message may be displayed on user equipment 12 at step 128.

Figure 12:
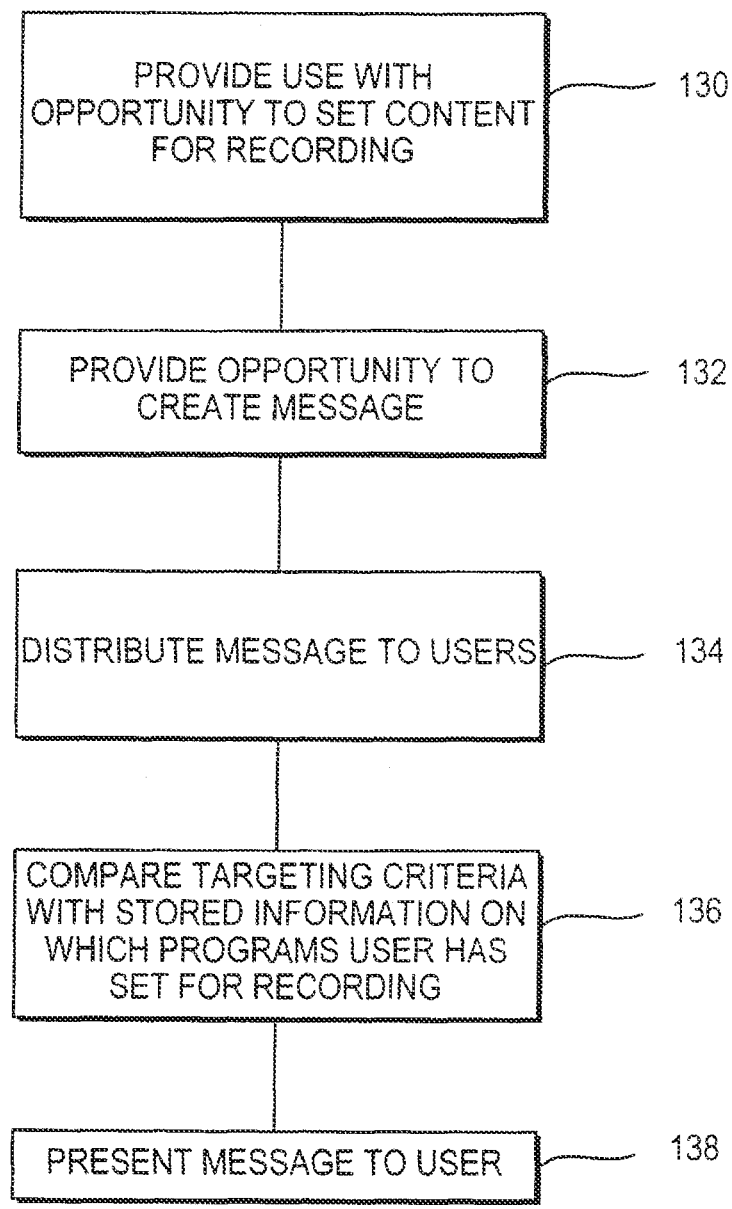
FIG. 12 is a flow chart of illustrative steps involved in providing targeted messages to users based on which content the user has selected for recording in accordance with the present invention.

Illustrative steps involved in providing messages to users based on which content the user has selected for recording are shown in FIG. 12. Content may include television programs, web casts, chat sessions, or any other suitable content. At step 130, the user may be provided with an opportunity to set certain content to be recorded. For example, the interactive television program guide may provide the user with on-screen lists of programs and channels. If the user highlights a desired channel or program and presses a remote control "record" key, the program guide may set a timed recording for that program. At the designated time, the program guide may record the selected program using videocassette recorder 36 (FIG. 2), digital video recorder 46 (FIG. 3), storage in personal computer 56 (FIG. 4), memory and storage 70 (FIG. 5), or other suitable user equipment 12. If desired, programs may also be recorded using remote equipment such as server 18, server 28, or computer 19. Programs may also be recorded by responding to on-screen options. Such options may be provided, for example, by a program guide when the user requests additional information for a program using a remote control "info" key. Information on the user's recording settings (e.g., which programs have been set for recording) may be stored on user equipment 12 (e.g., by the program guide), server 18, server 28, computer 19, any other suitable device, or a combination thereof.

At step 132, the program guide provider, television service provider, or any other provider may use a message creation tool to automatically or manually generate targeted messages to be delivered to the user. For example, a message promoting program X may be created for all subscribers who have set program Y to be recorded.

At step 134, the message may be distributed to users. For example, the message may be sent to users from a program guide provider at program guide data source 20 via path 30, communications network 24, and path 27, via path 30, communications network 24, path 26, television distribution facility 14, and path 16, or via path 22, television distribution facility 14, and path 16. Messages may be sent to users from a television service provider at television distribution facility 14 via path 16 or via path 26, communications network 24, and path 27.

At step 136, the program guide or other suitable interactive television application or the like may compare the targeting criteria from the message with stored user information by the interactive television application or other application in user equipment 12, server 18, server 28, computer 19, any other suitable device, or a combination thereof. In particular, the targeted message criteria may be compared with information on the recording settings that the user has established using an interactive program guide or other interactive television application. This type of information may, if desired, be maintained by the program guide. If the targeted message criteria are satisfied, the message may be displayed on user equipment 12 at step 138.

Figure 13:
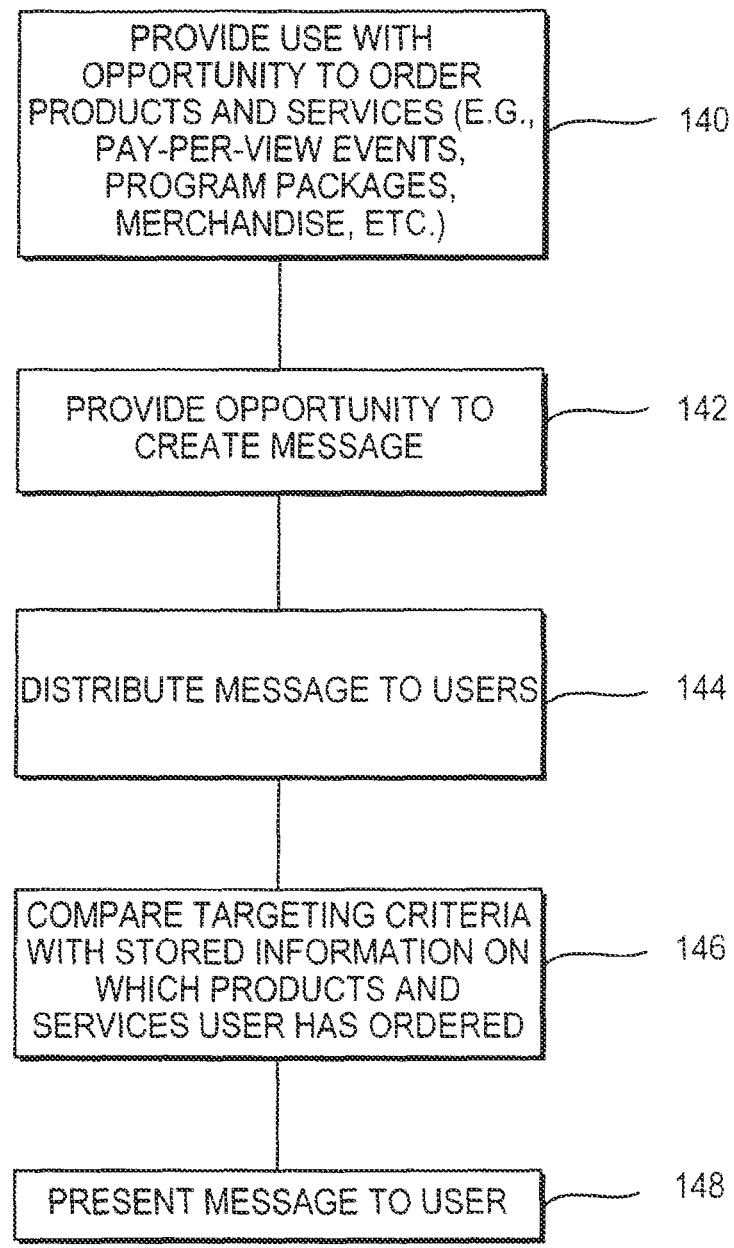
FIG. 13 is a flow chart of illustrative steps involved in providing targeted messages to users based on which products and services the user has ordered in accordance with the present invention.

Illustrative steps involved in providing messages to users based on which products and services the user has ordered are shown in FIG. 13. Products and services may include pay-per-view events, program packages (e.g., all football games on pay-per-view), merchandise (e.g., clothing), etc. At step 140, the user may be provided with an opportunity to order products or services. For example, the interactive television program guide may provide the user with on-screen lists of programs and channels. If the user highlights a desired pay-per-view program and presses a remote control "OK" key, the program guide may provide on-screen options that allow the user to order the pay-per-view program. Information on which pay-per-view programs the user has ordered may be stored on user equipment 12 (e.g., by the program guide), server 18, server 28, computer 19, any other suitable device, or a combination thereof. When the user desires to order any products and services, the system may direct the request via communications network 24 (e.g., the Internet) or any other suitable communications path to an appropriate vendor.

At step 142, the program guide provider, television service provider, or any other provider may use a message creation tool to automatically or manually generate targeted messages to be delivered to the user. For example, a message promoting pay-per-view program X may be created for all subscribers who have ordered pay-per-view program Y.

At step 144, the message may be distributed to users. For example, the message may be sent to users from a program guide provider at program guide data source 20 via path 30, communications network 24, and path 27, via path 30, communications network 24, path 26, television distribution facility 14, and path 16, or via path 22, television distribution facility 14, and path 16. Messages may be sent to users from a television service provider at television distribution facility 14 via path 16 or via path 26, communications network 24, and path 27.

At step 146, the program guide or other suitable interactive television application or the like may compare the targeting criteria from the message with stored user information by the interactive television application or other application in user equipment 12 (e.g., by the program guide), server 18, server 28, computer 19, any other suitable device, or a combination thereof. In particular, the targeted message criteria may be compared with information on which pay-per-view events the user has ordered using an interactive program guide or other interactive television application. This type of information may, if desired, be maintained by the program guide. If the targeted message criteria are satisfied, the message may be displayed on user equipment 12 at step 148.

In another approach, messages may be used by a program guide or other application based on television service provider settings. The television service provider may enable the user equipment to receive some services, but not others. For example, the user equipment may be enabled to receive a certain lineup of television channels, which is different than the channel lineup of user equipment used by other users. The user equipment may be enabled to access certain interactive applications or have other features that are not available to all users. Messages may be targeted based on such television service provider settings, so that, for example, messages may be not displayed to users not having access to related features. For example, a message may inform the user of last minute schedule changes on a particular television channel, and may be targeted to only those users who have that channel in their channel lineups. Users who do not have access to the particular channel need not be notified of such changes.

Figure 14:
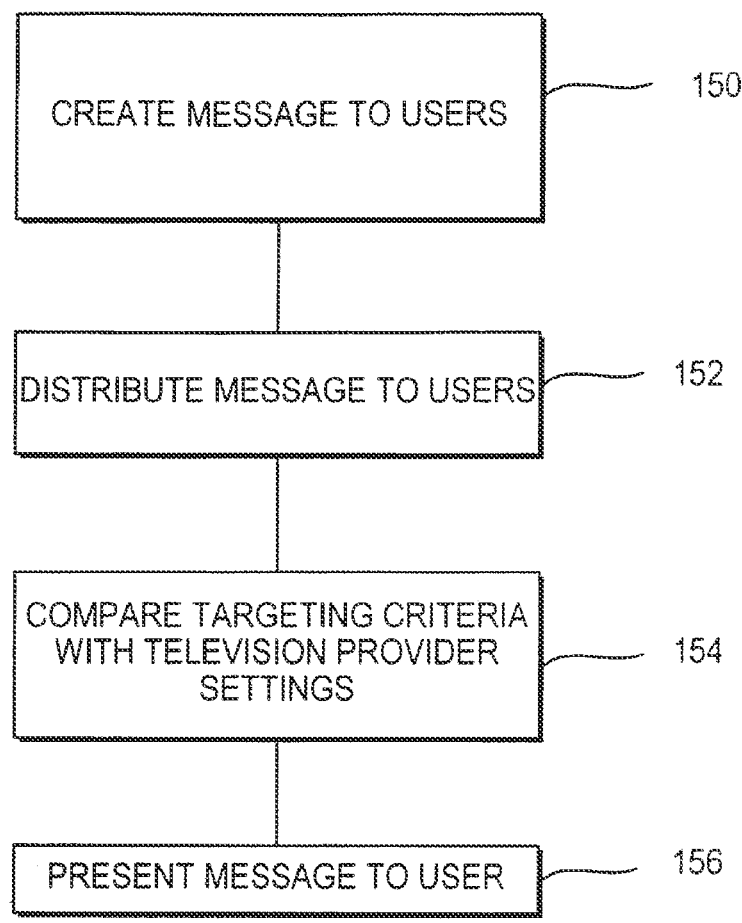
FIG. 14 is a flow chart of illustrative steps involved in providing targeted messages to users based on settings from a television service provider in accordance with the present invention.

Illustrative steps involved in providing messages to users based on settings from a television service provider are shown in FIG. 14. At step 150, the program guide provider, television service provider, or any other provider may use a message creation tool to automatically or manually generate targeted messages to be delivered to the user. For example, a message presenting a schedule change for channel X may be created for all subscribers who have access to channel X.

At step 152, the message may be distributed to users. For example, the message may be sent to users from a program guide provider at program guide data source 20 via path 30, communications network 24, and path 27, via path 30, communications network 24, path 26, television distribution facility 14, and path 16, or via path 22, television distribution facility 14, and path 16. Messages may be sent to users from a television service provider at television distribution facility 14 via path 16 or via path 26, communications network 24, and path 27.

At step 154, the program guide or other suitable interactive television application or the like may compare the targeting criteria from the message with stored user information by the interactive television application or other application in user equipment 12, server 18, server 28, computer 19, any other suitable device, or a combination thereof. In particular, the targeted, message criteria may be compared with stored user information from the television service provider. This type of information may, if desired, be maintained by the program guide. If the targeted message criteria are satisfied, the message may be displayed on user equipment 12 at step 156.

Thus, systems and methods for distributing and using electronic messages in an interactive television environment are provided. The foregoing is merely illustrative of the principles of this invention and various modifications can be made by those skilled in the art without departing from the scope and spirit of the invention.

What is claimed is:

1. A method of targeting messages to a user of a media application, the method comprising:
   receiving a message from a server, wherein the message has associated targeting criteria indicating that the message is to be displayed only to subscribers of a particular media programming service who meet particular viewing activity specifications;
   accessing a database to retrieve user information, wherein the retrieved user information includes user subscription information and user viewing activity information, wherein the user viewing activity information includes settings selected by the user in the media application for ordering products and media programming services;
   determining, with a processor, whether the user is a subscriber to the particular media programming service by comparing the targeting criteria and the retrieved user subscription information;
   determining, with the processor, whether the user meets the particular viewing activity specifications by comparing the settings selected by the user for ordering products and media programming services and settings identified by the particular viewing activity specifications; and
   generating the message for display to the user in response to determining that: (i) the targeting criteria match the retrieved user subscription information and (ii) the settings selected by the user for ordering products and media programming services match the settings identified by the particular viewing activity specifications.

2. The method defined in claim 1, wherein the user viewing activity information further includes settings selected by the user in the media application for at least one of: a reminder to view a media program, a favorite setting, a parental control setting, and a setting to record a media program.

3. The method defined in claim 1, wherein the generating the message for display comprises generating the message for display using a set-top box.

4. The method defined in claim 1, wherein the generating the message for display comprises generating the message for display using a digital video recorder.

5. The method defined in claim 1, wherein the comparing the targeting criteria and the retrieved user subscription information uses boolean logic terms.

6. The method defined in claim 1, wherein the determining whether the user meets the particular viewing activity specifications includes determining that the user is not a subscriber to a second particular media programming service.

7. The method defined in claim 1, wherein the user information includes settings selected by the user using another media application.

8. The method defined in claim 1, wherein the message includes audio and video.

9. A system for targeting messages to a user of a media application, comprising:
   user equipment configured to:
      receive a message from a server, wherein the message has associated targeting criteria indicating that the message is to be displayed only to subscribers of a particular media programming service who meet particular viewing activity specifications, and
   access a database to retrieve user information, wherein the retrieved user information includes user subscription information and user viewing activity information, wherein the user viewing activity information includes settings selected by the user in the media application for ordering products and media programming services; and
   a processor that determines, whether the user is a subscriber to the particular media programming service by comparing the targeting criteria and the retrieved user subscription information, and whether the user meets the particular viewing activity specifications by comparing the settings selected by the user for ordering products and media programming services and settings identified by the particular viewing activity specifications,
   wherein the processor generates the message for display to the user on the user equipment in response to determining that (i) the targeting criteria match the retrieved user subscription information and (ii) the settings selected by the user for ordering products and media programming services match the settings identified by the particular viewing activity specifications.

10. The system defined in claim 9, wherein the user viewing activity information further includes settings selected by the user in the media application for at least one of: a reminder to view a media program, a favorite setting, a parental control setting, and a setting to record a media program.

11. The system defined in claim 9, wherein the processor generates the message for display using a set-top box.

12. The system defined in claim 9, wherein the processor generates the message for display using a digital video recorder.

13. The system defined in claim 9, wherein the processor compares the targeting criteria and the retrieved user subscription information at least by using boolean logic terms.

14. The system defined in claim 9, wherein the processor determines whether the user meets the particular viewing activity specifications at least by determining that the user is not a subscriber to a second particular media programming service.

15. The system defined in claim 9, wherein the user information includes settings selected by the user using another media application.

16. The system defined in claim 9, wherein the message includes audio and video.

* * * * *